United States Patent
Ito et al.

(10) Patent No.: US 7,327,051 B2
(45) Date of Patent: Feb. 5, 2008

(54) LIGHTING CONTROL CIRCUIT FOR VEHICLE LAMPS

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 281 days.

(21) Appl. No.: 11/242,756

(22) Filed: Oct. 4, 2005

(65) Prior Publication Data

US 2006/0082332 A1 Apr. 20, 2006

(30) Foreign Application Priority Data

Oct. 5, 2004 (JP) ............... P. 2004-292161

(51) Int. Cl.
*B60L 1/14* (2006.01)
(52) U.S. Cl. .............. 307/10.8; 315/299; 315/308
(58) Field of Classification Search .......... 315/77, 315/82, 291, 299, 307, 308, 312, 320, 324; 307/10.1, 10.8
See application file for complete search history.

(56) References Cited

U.S. PATENT DOCUMENTS 6,836,081 B2 * 12/2004 Swanson et al. ............ 315/307
7,233,115 B2 * 6/2007 Lys ............................ 315/291
7,256,554 B2 * 8/2007 Lys ............................ 315/291

FOREIGN PATENT DOCUMENTS

| DE | 199 50 135 A1 | 4/2001 |
| DE | 101 21 380 A1 | 12/2002 |
| DE | 102 36 862 A1 | 3/2004 |
| DE | 103 46 528 A1 | 4/2004 |
| EP | 1 079 667 A2 | 2/2001 |
| JP | 2004-134147 | 4/2004 |

* cited by examiner

*Primary Examiner*—Thuy Vinh Tran
(74) *Attorney, Agent, or Firm*—Fish & Richardson P.C.

(57) ABSTRACT

The supply of a predetermined current to LEDs is controlled by using series regulators. In accordance with the controlled states of the series regulators, a switching regulator adjusts an output voltage relative to the LEDs to the maximum voltage. When a ground fault occurs at the anode of one of the LEDs, and when a short circuit occurs at the output terminal of the switching regulator and the output voltage drops abnormally, the operation of the switching regulator is halted. When the gate voltage of an NMOS transistor is raised due to the disconnection of one of the LEDs, or when the drain voltage of the transistor is raised due to a short circuit at one of the LEDs, a Zener diode becomes conductive and an NPN transistor and a PNP transistor are rendered on. Then, a current flows through a diode, and as the gate voltage has been lowered, the operation of the NMOS transistor is halted, so that the remaining, normal LEDs are protected when an abnormality occurs.

16 Claims, 3 Drawing Sheets

LIGHTING CONTROL CIRCUIT FOR VEHICLE LAMPS

The present application claims foreign priority based on Japanese Patent Application No. P.2004-292161, filed on Oct. 5, 2004, the contents of which are incorporated herein by reference.

BACKGROUND OF THE INVENTION

1. Field of the Invention

The present invention relates to a lighting control circuit for vehicle lamps, and particularly relates to a lighting control circuit for vehicle lamps that controls the lighting of a semiconductor light source constituted by a semiconductor light-emitting device.

2. Related Art

There is a vehicle lamp wherein a semiconductor light-emitting device such as LEDs (Light Emitting Diodes) is employed as light sources. A lighting control circuit for controlling the lighting of LEDs is mounted on the vehicle lamp.

In the lighting control circuit, one type of a lighting control circuit employs a switching regulator for controlling voltages to be output to LEDs based on the current supplied to the LEDs. Even when a plurality of LEDs are connected in series or in parallel to the switching regulator, the switching regulator can control the output voltage so that a designated current can be supplied to the individual LEDs.

However, when the output of the switching regulator is short-circuited, or is disabled by a ground-fault, an increased load will be imposed on the switching regulator, which will malfunction if the power load becomes excessive. Furthermore, if the output side of the switching regulator is opened due to a disconnection, the output voltage will be sharply raised when the switching regulator is, for example, a flyback type.

Therefore, JP-A-2004-134147 discloses a switching regulator in which an output voltage is dropped when an abnormality is detected on an output side of the switching regulator.

In the lamp of JP-A-2004-134147, a plurality of LED blocks with a plurality of LEDs connected in series are connected in parallel on the output side of a switching regulator. The individual LED blocks and the switching regulator are connected via a shunt resistor, and the output voltage is controlled so that a predetermined current flows through the shunt resistor, and so that the output voltage is dropped when an abnormality occurs. Thus, even when a failure affecting part of the LEDs occurs, the rest of the LEDs are protected and in a normal state. However, this arrangement cannot always satisfactorily supply a predetermined current to the individual LED blocks. That is, since the current supplied to each LED block is not monitored, this arrangement cannot adequately and consistently supply a predetermined current to all the LED blocks, even when all the LED blocks are in the normal state.

SUMMARY OF THE INVENTION

One or more embodiments of the present invention provide a lighting control circuit in which normal semiconductor light sources are protected, when an abnormality occurs either in a specific semiconductor light source or in a circuit associated with the semiconductor light source, during a process in which a predetermined current is supplied to a plurality of semiconductor light sources connected in parallel.

In accordance with one or more embodiments of the present invention, a lighting control circuit for a vehicle lamp is provided with:

a plurality of series regulators including:
  a plurality of current detection devices for detecting a current supplied to a plurality of semiconductor light sources connected in parallel;
  a plurality of switching devices connected in series to the semiconductor light sources; and
  a plurality of comparators for comparing currents detected by the current detection devices with a predetermined value, and for controlling the ON/OFF operations of the switching devices in accordance with the comparison results;

a switching regulator for supplying a current to the plurality of semiconductor light sources as light emission energy by employing a voltage received from a power source as light emission energy for the plurality of semiconductor light sources, and for adjusting a voltage to be output to the semiconductor light source to the maximum in accordance with states of the series regulators; and a plurality of protection controllers for setting the states of the switching devices to a safe state in response to a voltage applied to the switching devices or to abnormalities detected as a result of a comparison performed by the comparators.

In the lighting control circuit, the switching regulator monitors the voltage to be output to the semiconductor light sources and sets the states of the semiconductor light sources to safe states upon the detection of an abnormal drop in the output voltage.

Under the control of the series regulator, a predetermined current is supplied to multiple parallel connected semiconductor light sources. Further, during a process wherein the switching regulator, in accordance with the current states of the series regulators, adjusts to the maximum the voltage to be output to the semiconductor light sources upon the occurrence of an abnormality in a voltage applied to the switching devices or upon the reception of the comparison results obtained by the comparators, e.g., when a specific semiconductor light source, or a circuit associated with the semiconductor light source, is disconnected (opened) and the voltage obtained by the corresponding comparator, as indicated by the comparison results, is increased, or when a specific semiconductor light source is short-circuited or a voltage to be applied to the semiconductor device is raised due to leakage, the state of the switching device whereat the abnormality has occurred is set to the safe state, e.g., the operation of the switching device is halted. Furthermore, when the output voltage of the switching regulator drops abnormally, e.g., when the output side of the switching regulator is short-circuited because of a ground fault on the anode side of a semiconductor light source and the operating state of the switching regulator is controlled in the safe state, the operation of the switching regulator is halted. Therefore, according to this arrangement, a predetermined current can always be supplied to the normal semiconductor light sources, and when an abnormality at a specific semiconductor light source or in a circuit associated with this light source occurs, the remaining normal semiconductor light sources can be protected.

As apparent from this explanation, a predetermined current can be consistently supplied to normal semiconductor light sources, and when an abnormality occurs in one of the semiconductor light sources, or in an associated circuit, the remaining normal semiconductor light sources can be protected.

In accordance with one or more embodiments of the present invention, in the lighting control circuit, as resistor devices, the current detection devices of the series regulators may be connected in series with the switching devices to the semiconductor light sources. Voltage drop values for the current detection devices may be set greater than a range for a difference in the forward voltages of the plurality of switching devices. The operating state of the switching regulator may be set to the safe state when a condition exists wherein the comparison results obtained by all the plurality of comparators indicate an abnormality.

As resistor devices, the current detection devices of the individual series regulators are connected with the switching devices to the semiconductor light sources, and the resistances of the current detection devices are set so that the voltage drop values of the current detection devices are greater than the range of the difference in the forward voltages of the switching devices. In this arrangement, assume a ground-fault has occurred at the cathode of a specific semiconductor light source and that the corresponding series regulator is by-passed by the ground fault, as an example circuit abnormality associated with a specific semiconductor light source. In this case, even when the ground fault has occurred on the cathode side of the semiconductor light source, where the difference in the forward voltage is the largest, the output voltage of the switching regulator is clamped at the forward voltage of the semiconductor light source whereat the ground-fault has occurred. Therefore, a difference voltage (a voltage equal to or less than the forward voltage), between the forward voltage of the semiconductor light source whereat the ground fault has occurred and the voltage drop of the current detection device, is applied to the other semiconductor light sources whereat no ground fault has occurred. In addition, a current is not supplied to the semiconductor light sources whereat a ground fault has not occurred. As a result, the comparators of the series regulator continuously output the comparison results to the switching devices in order to supply the predetermined current to the individual loads, even when the detected current is zero. Then, the comparison results of all the comparators indicate that the abnormality, i.e., a high voltage, and the operating state of the switching regulator is changed to a safe state, e.g., the operation of the switching regulator is halted. In this manner, the normal semiconductor light sources can be protected.

As apparent from this explanation, even when a ground fault occurs at the cathode of a specific semiconductor light source, the other normal semiconductor light sources can be protected.

In accordance with one or more embodiments of the present invention, the lighting control circuit may be further provided with an operation halt instruction unit, for monitoring a protection control operation performed by the plurality of protection controllers and for outputting an operation halt instruction to the switching regulator when the number of the protection controllers that performed the protection control operation has reached a predetermined number.

The protection control operation performed by the plurality of protection controllers, which set the operating state of the switching devices to the safe state, is monitored, and an operation halt instruction is issued to the switching regulator when the number of protection controllers that performed the protection operation has reached the predetermined number. With this arrangement, all the semiconductor light sources can be turned off to force a driver to repair an abnormal portion, so that interference with safe driving can be prevented.

As apparent from this explanation, all the semiconductor light sources can be turned off to force a driver to repair an abnormal portion, so that interference with safe driving can be prevented.

In accordance with one or more embodiments of the present invention, the lighting control circuit may be further provided with an abnormality information output unit, for monitoring the protection control operation performed by the plurality of protection controllers and for externally outputting abnormality information when one of the protection controllers performs the protection control operation.

When one of the protection controllers performs the protection control operation, abnormality information is externally output, and an indicator lamp provided, for example, inside a vehicle is turned on by the abnormality information. In this manner, the driver can be notified that an abnormality has occurred in a semiconductor light source.

As apparent from this explanation, since abnormality information is externally output when one of protection controllers performs a protection control operation, a driver can be notified of the occurrence of an abnormality in a specific semiconductor light source.

Other aspects and advantages of the invention will be apparent from the following description and the appended claims.

DESCRIPTION OF THE PREFERRED EMBODIMENTS

Embodiments of the invention will be described with reference to the accompanying drawings.

Figure 1:
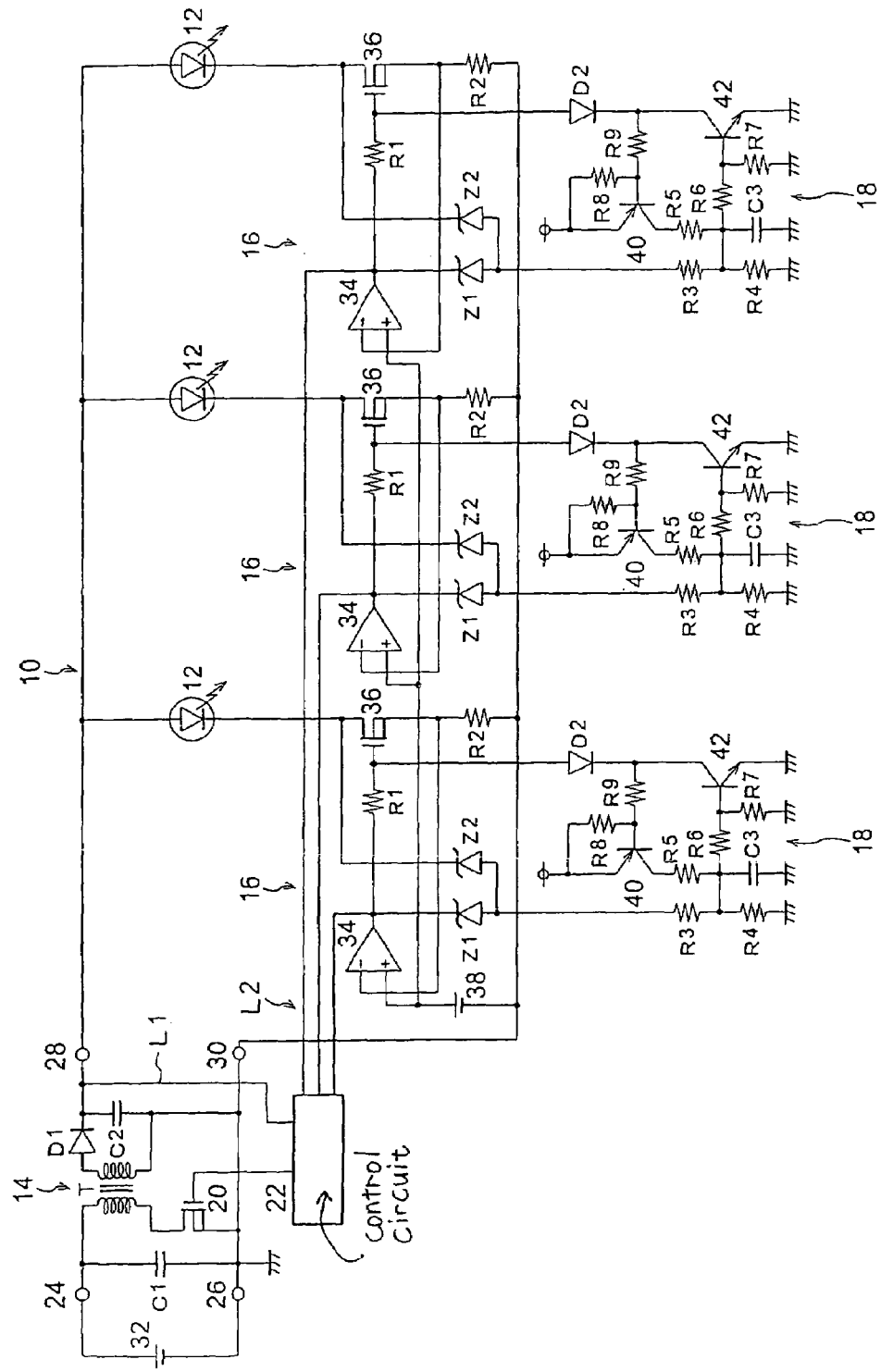
FIG. 1 is a circuit diagram showing the configuration of a lighting control circuit for a vehicle lamp according to a first embodiment of the present invention.
Figure 2:
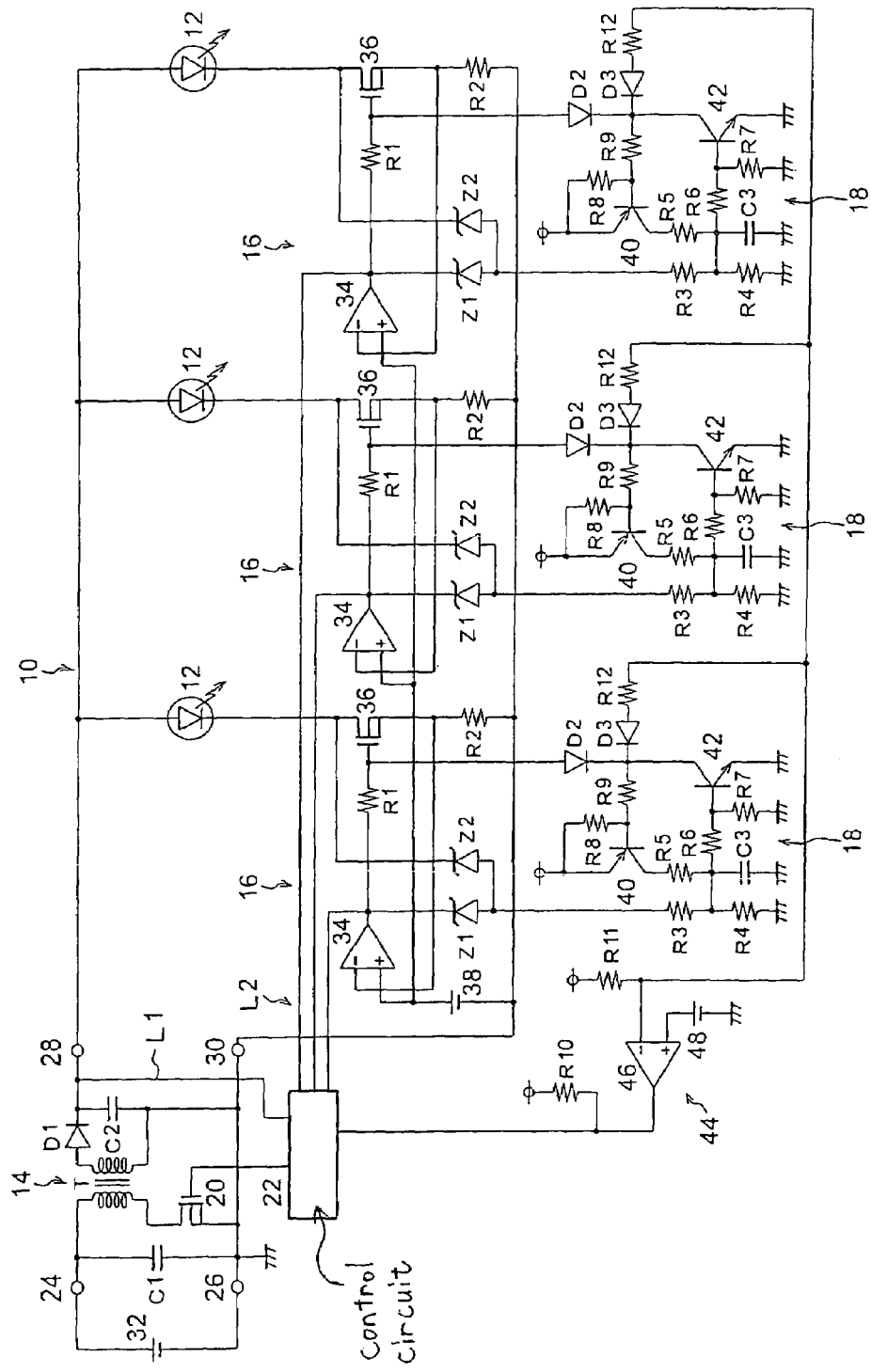
FIG. 2 is a circuit diagram showing the configuration of a lighting control circuit for a vehicle lamp according to a second embodiment of the present invention.
Figure 3:
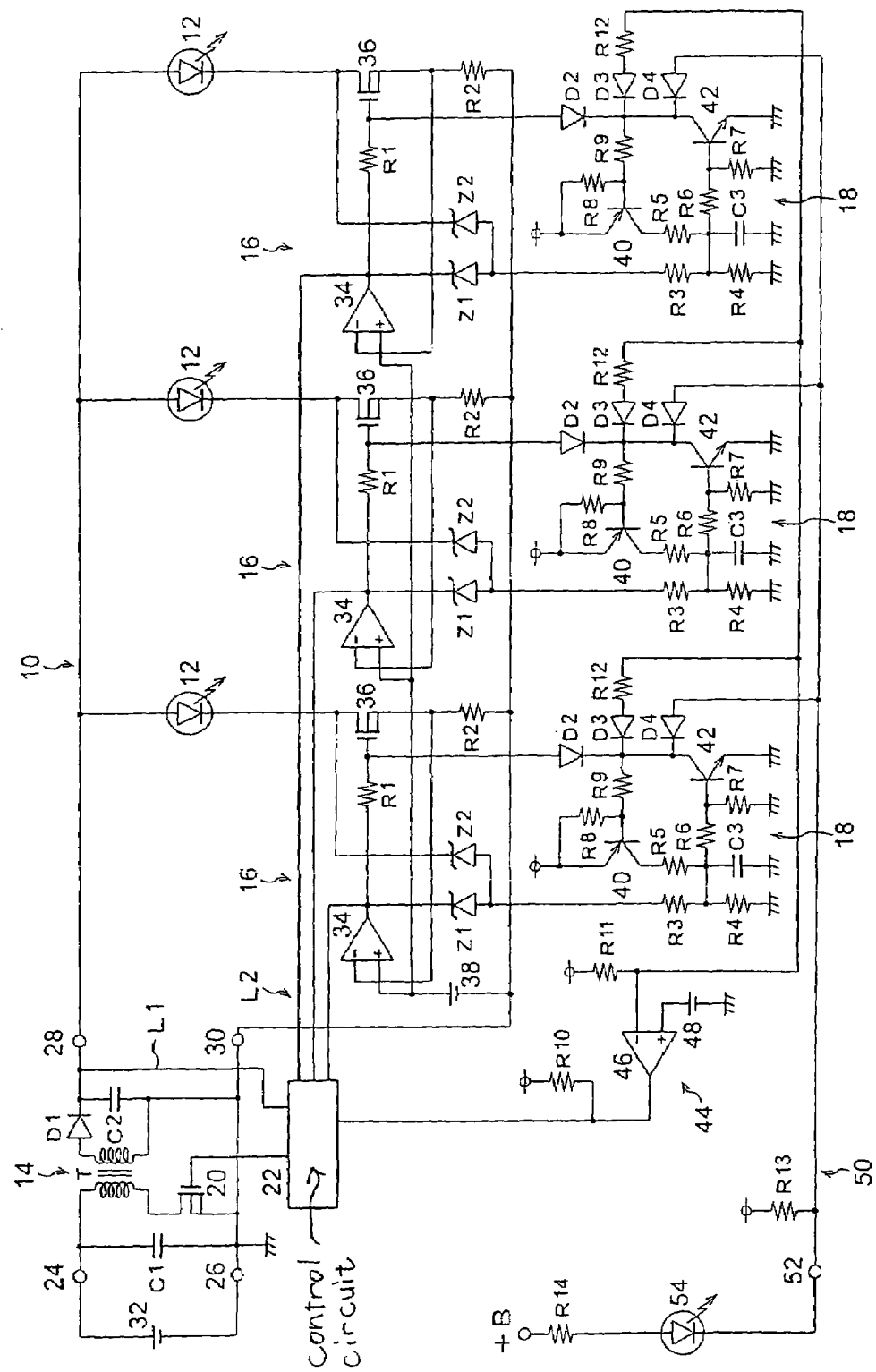
FIG. 3 is a circuit diagram showing the configuration of a lighting control circuit for a vehicle lamp according to a third embodiment of the present invention.

FIG. 1 is a circuit diagram showing a lighting control circuit for a vehicle lamp according to a first embodiment of the present invention. FIG. 2 is a circuit diagram showing a lighting control circuit for a vehicle lamp according to a second embodiment of the present invention. And FIG. 3 is a circuit diagram showing a lighting control circuit for a vehicle lamp according to a third embodiment of the present invention.

In FIG. 1 for the first embodiment, as one component of a vehicle lamp (light-emitting apparatus), a lighting control circuit 10 includes: one switching regulator 14, three series regulators 16 and three protection control circuits 18, relative to three LEDs 12. The individual LEDs 12 are connected in parallel as semiconductor light sources constituted by semiconductor light-emitting devices, and are connected in series to the series regulators 16 on the output side of the switching regulator 14. Either LEDs 12 connected in series or LEDs connected in parallel may be employed and connected in series to the individual series regulators 16. Further, the LEDs 12 can be constituted as light sources for various types of vehicle lamps, such as headlamps, stop lamps, tail lamps, front fog lamps and turn signal lamps.

The switching regulator 14 includes capacitors C1 and C2, a transformer T, a diode D1, an NMOS transistor 20 and a control circuit 22, while both terminals of the capacitor C1 are connected to power input terminals 24 and 26 and both terminals of the capacitor C2 are connected to output terminals 28 and 30. The power input terminal 24 is connected to the positive terminal of a vehicular mounted battery 32, and the power input terminal 26 is connected to the negative terminal of the vehicular mounted battery 32. Further, three series circuits, consisting of the LEDs 12 and the series regulators 16, are connected in parallel to the output terminals 28 and 30.

Each of the series regulators 16 includes a comparator 34, an NMOS transistor 36, resistors R1 and R2 and a reference power source 38 for generating a reference voltage. The NMOS transistor 36 is connected in series, as a switching device, to the LED 12 with the shunt resistor R2. Instead of the NMOS transistor 36, another switching device may be employed, and only one reference power source 38 may be employed in common by the series regulators 16, or as in this embodiment, the separate reference power sources 38 may be independently provided for the series regulators 16. The comparator 34 compares a reference voltage input to the positive input terminal with a voltage drop (a voltage drop at the shunt resistor R2) input to the negative input terminal, generates a gate voltage (a control signal) consonant with the comparison results, and applies the gate voltage to the gate of the NMOS transistor 36, through the resistor R1, to render on or off the NMOS transistor 36, so that the supply of a predetermined current to the individual LEDs 12 is controlled.

Specifically, in the individual series regulators 16, the shunt resistors R2 detect a current flowing through the LEDs 12 and the detected currents are transformed into voltages while the thus obtained voltages are compared with the predetermined reference voltage by the comparators 34, and in accordance with the comparison results, the ON/OFF states of the NMOS transistors 36 are controlled and the predetermined current is supplied to the individual LEDs 12. The variance in the Vf-If characteristics of the individual LEDs 12 is absorbed by the individual NMOS transistors 36.

Furthermore, the resistances of the shunt resistors R2, which serve as current detection devices, are set so that their voltage drops are greater in value than is the range of the difference in the Vfs (forward voltages) of the LEDs 12. For example, when the forward voltages Vf of the three LEDs 12 are 7.5 V, 7.5 V and 8.0 V, the difference in the forward voltages Vf is 0.5 V, and the resistances of the shunt resistors R2 are set so that their voltage drops exceed 0.5 V.

The switching regulator 14 renders on or off the NMOS transistor 20 in accordance with a switching signal output by the control circuit 22, e.g., at a frequency of several tens to several hundreds of kHz, and transforms a direct current voltage applied between the power input terminals 24 and 26 into an alternating current voltage in order to use the voltage as light emission energy for the LEDs 12. The obtained alternating current voltage is smoothed by the diode D1 and the capacitor C2, and the smoothed direct current is transmitted to the LEDs 12.

Furthermore, in the switching regulator 14, along line L1, the control circuit 22 monitors the voltage output between the output terminals 28 and 30. And in order to feed back the controlled states of the individual series regulators 16, based on the voltages output by the comparators 34 (voltages along lines L2), the switching regulator 14 adjusts the output voltage to a maximum voltage that is equal to the highest voltage of the three series circuits, each consisting of a LED 12 and a series regulator 16.

For example, in the processing during which the series regulators 16 supply a predetermined current to the corresponding LEDs 12, the gate voltages of the NMOS transistors 36 are set to a threshold voltage, e.g., near 2 to 3 V. At this time, when a current flowing through one of the LEDs 12 is less than the predetermined current, the gate voltage of the corresponding NMOS transistor 36 is raised. And when the gate voltage of the specific NMOS transistor 36 is raised, the control circuit 22 controls the ON/OFF state of the NMOS transistor 20, in order to increase the output voltage of the switching regulator 14. Further, when the gate voltages of all the NMOS transistors 36 are lowered to near the threshold voltage level, the ON/OFF state of the NMOS transistor 20 is controlled so as to reduce the output of the switching regulator 14. Thus, the switching regulator 14 can adjust the output voltage to a voltage level near which the largest variance in the forward voltage Vf of all three LEDs 12 is present.

Assume that the forward voltages Vf of the three LEDs 12 are 7.5 V, 7.5 V and 8.0 V, the voltage drop for the shunt resistors R2 is set to 0.5 V, and a current of 1.0 A is supplied to the individual LEDs 12. Then, since the switching regulator 14 adjusts the output voltage to a voltage equal to the highest forward voltage Vf of the LED 12, the output voltage of the switching regulator 14 is 8.5 V. The power output by the switching regulator 14 is 8.5 V×1.0 A×three columns=25.5 W, and the power actually consumed by the individual LEDs 12 is 7.5 V×1.0 A×two columns+8.0 V×1.0 A=23.0 V. Therefore, the power efficiency for the switching regulator 14 is about 90%, and there is a power loss of only 2.5 W. At this time, for the NMOS transistor 36 connected to the LED 12 having the forward voltage of 7.5 V, the voltage drop between the drain and the source is 0.5 V, and for the NMOS transistor 36 connected to the LED 12 having the forward voltage Vf of 8.0 V, the voltage drop between the drain and the source is 0 V, i.e., the NMOS transistor 36 is in almost a saturated state.

Further, in the switching regulator 14, the control circuit 22 monitors the gate voltages of the NMOS transistors 36 along the lines L2, and when the gate voltages of all the NMOS transistors 36 are raised abnormally, for example, it halts the switching operation in order to control the operation of the switching regulator 14 in the safe state. Specifically, when a ground fault occurs on the cathode side of one of the LEDs 12, the series regulator 16 connected to the LED 12 is bypassed by the ground fault. That is, the voltage Vf of the LED 12 whereat the ground fault has occurred is applied to the other two LEDs 12. However, since the voltage drops of the shunt resistors R2 of the individual series regulators 16 are set to a value that is greater than the range of the variance of the forward voltages Vf of the LEDs 12, even when the ground fault occurs at the cathode of the LED 12 having the largest variance of the forward voltage Vf, a voltage higher than the voltage Vf is not applied to the other two LEDs 12, and a satisfactory current can not be supplied to these two LEDs 12. At this time, since the individual comparators 34 perform a control process to supply a predetermined current to the target NMOS transistors 36, even when a satisfactory current does not flow through these NMOS transistors 36, the gate voltages are gradually raised due to the output of the comparators 34, and when this state is continued, the current for the LEDs 12 can not be controlled by the series regulators 16. Therefore, in this embodiment, when a ground fault occurs at the cathode of one of the LEDs 12, and the gate voltages of all the NMOS transistors 36 become abnormal, the switching operation performed by the switching regulator 14 is halted to protect the LEDs 12.

Furthermore, in the switching regulator 14, the control circuit 22 monitors the output voltage of the switching regulator 14 along the line L1. Then, if a ground fault occurs on an anode at one of the LEDs 12, i.e., if a short circuit occurs between the output terminals 28 and 30 of the switching regulator 14, it is assumed that the output voltage of the switching regulator 14 becomes abnormal. And when an abnormal drop in the output voltage is detected, the control circuit 22 changes the switching operation of the switching regulator 14 to the safe state, e.g., halts the switching operation, so that the LEDs 12 are protected.

The protection control circuits 18 are protection control means that change the operational states of the NMOS transistors 36 to the safe state in response to an abnormality in the gate voltages due to the voltages applied to the individual LEDs 12 or due to the outputs of the comparators 34, and each include: Zener diodes Z1 and Z2, a diode D2, resistors R3, R4, R5, R6, R7, R8 and R9, a capacitor C3, a PNP transistor 40 and an NPN transistor 42. The cathode of the Zener diode Z1 is connected to the output terminal of the comparator 34, the cathode of the Zener diode Z2 is connected to the drain of the NMOS transistor 36, and the anode of the diode D2 is connected to the gate of the NMOS transistor 36.

Each of the Zener diodes Z1 detect the occurrence of an abnormality in the gate voltage due to the output of the comparator 34. Under a condition wherein the Zener diode Z1 detects an abnormality in the gate voltage, the operational state of each NMOS transistor 36 is set to the safe side. Specifically, when, for example, the circuit (wiring) associated with an LED 12 is disconnected, or the wire bonding of the LED 12 is disconnected, a current does not flow to the NMOS transistor 36 connected in series with the LED 12. However, since the comparator 34 performs the control to supply a predetermined current to the corresponding NMOS transistor 36 even when a current does not flow through the NMOS transistor 36, the gate voltage is gradually raised due to the output of the comparator 34, and the NMOS transistor 36 is fully saturated and rendered on. Further, when the gate voltage exceeds the Zener voltage of the Zener diode Z1, due to the output of the comparator 34, a Zener current is supplied to the Zener diode Z1 and the capacitor C3 is charged. The capacitor C3 functions as a filter to prevent the NPN transistor 42 from being erroneously operated, and charges are accumulated in the capacitor C3 in accordance with a time constant that is defined by the resistor R4 and the capacitor C3. When the voltages at both terminals of the capacitor C3 are higher than the threshold voltage of the NPN transistor 42, the NPN transistor 42 is rendered on and the potential at the collector of the NPN transistor 42 is lowered. Accordingly, the PNP transistor 40 is rendered on, a current is supplied to the diode D2, the gate voltage of the NMOS transistor 36 is lowered, and the NMOS transistor 36 connected to the LED 12, whereat the abnormality has occurred, is rendered off.

Each of the Zener diodes Z2 monitors the occurrence of the abnormality on a voltage to be applied to the NMOS transistor 36, i.e., the drain voltage. When a short circuit occurs at both terminals of the LED 12, or when a leakage occurs because of a failure of the LED 12, the Zener diode Z2 detects an abnormality as the drain voltage is raised. For example, the voltage at both terminals of the LED 12 is 0 V when a short circuit occurs at both terminals of the LED 12, or is a voltage lower than the forward voltage Vf when a leakage occurs. Therefore, the voltage between the drain and the source of the NMOS transistor 36 connected to the LED 12, whereat the abnormality has occurred, is raised more than normally. When the voltage between the drain and the source is higher than the Zener voltage of the Zener diode Z2, the Zener current flows through the Zener diode Z2 and the capacitor C3 is charged. And when the voltage at both terminals of the capacitor C3 exceeds the threshold voltage for the NPN transistor 42, the NPN transistor 42 and the PNP transistor 40 are rendered on. At the same time, a current flows across the diode D2, the gate voltage of the NMOS transistor 36 is lowered, and the NMOS transistor 36 is rendered off.

That is, when wiring connected to the LED 12 is disconnected, or the LED 12 is disconnected, each of the protection control circuits 18 can render off the corresponding NMOS transistor 36 to set the operational state of the NMOS transistor 36 to the safe state. In this manner, when an abnormality occurs in a specific LED 12 or in a circuit associated with the LED 12, the other LEDs 12 and the circuit components of the series regulators 16 are protected.

In addition, when a short circuit has occurred at both terminals of a specific LED 12 or a leakage has occurred because of a failure at the LED 12, the protection control circuits 18 can render off the NMOS transistors 36 in order to set the operational states of the NMOS transistors 36 to the safe state. In this manner, when an abnormality occurs in a specific LED 12 or in a circuit associated with that LED 12, the other LEDs and the circuit components of the series regulators 16 are protected.

A second embodiment of the present invention will now be described while referring to FIG. 2. According to this embodiment, an operation halt instruction circuit 44 is additionally provided as operation halt instruction means that issues an operation halt instruction to a switching regulator 14 when the number of protection control circuits 18 that have performed a protection control operation has reached a predetermined number. The remainder of the configuration is the same as that shown in FIG. 1.

The operation halt instruction circuit 44 includes resistors R10 and R11, a comparator 46, and three diodes D3 and three resistors R12 that correspond to those of the protection control circuits 18. The cathodes of the diodes D3 are connected to the collectors of NPN transistors 42, the junction of the resistors R10 and R11 is connected to the negative input terminal of the comparator 46, a reference power source for generating a reference voltage 48 is connected to the positive input terminal of the comparator 46, and the output terminal of the comparator 46 is connected to a control circuit 22.

When the protection control circuits 18 initiate the protection control operation, the NPN transistors 42 are rendered on and a current is supplied through the resistors R11 and R12, the diodes D3 and the NPN transistors 42, and the potentials of the negative input terminals of the comparators 46 are lowered as the number of the NPN transistors 42 that are rendered on is increased. When the voltages at the negative input terminals of the comparators 46 are lower than the reference voltage, the outputs of the comparators 46 are inverted, from the low to the high level, and an operation halt instruction is issued to the control circuit 22. That is, when a high level signal is output by the comparators 46, the control circuit 22 assumes that the number of LEDs 12 whereat an abnormality has occurred has reached a predetermined number and halts the switching operation of the switching regulator 14, so that all the LEDs 12 are turned off.

Specifically, for example, a headlamp is constituted by using multiple LEDs 12 to provide the distribution of light intensity required for safe driving. And since when the number of malfunctioning LEDs 12 has reached a predetermined number this would hinder driving, all the LEDs 12 are turned off to force a driver to repair the malfunctioning LEDs 12.

A predetermined count at which the switching operation of the switching regulator 14 is to be halted, i.e., the number of the protection control circuits 18 that perform the protection control operation, can be determined in accordance with the number of LEDs 12, and priorities for the LEDs 12 can also be designated. In this case, the following configuration can also be employed. When the same resistance is set for all the resistors R12, the priorities relative to all the LEDs 12 is the same. But when the resistance of one resistance R12 is half that of the other resistors R12, the priority of the output of the LED 12 that corresponds to the resistor R12 that has half the resistance is double the priority of the other LEDs 12. Further, for a hot spot LED 12 that is important to the generation of the distribution of light intensity, a priority equivalent to two priorities is designated. Thus, when the operation of the hot spot LED 12 is abnormal, the switching operation of the switching regulator 14 is immediately halted.

In addition, for the process to determine whether a predetermined number of protection control circuits 18 that have performed the protection control operation has been reached, the predetermined number can be determined by using the reference voltage of the comparators 46.

A third embodiment of the invention will now be explained. According to this embodiment, an abnormality information output circuit 50 is additionally provided as abnormality information output means for monitoring protection control operations performed by protection control circuits 18, and when any of the protection control circuits 18 performs a protection control operation, it outputs abnormality information externally. The remainder of the configuration is the same as that shown in FIG. 2.

The abnormality information output circuit 50 includes a resistor R13 connected to a power source, and three diodes D4, corresponding to the protection control circuits 18. The cathodes of the diodes D4 are connected to the collectors of NPN transistors 42 and the junction of the resistor R13 and the diodes D4 is connected to an external connection terminal 52. The external connection terminal 52, for outputting the abnormality information externally, is connected to the power source via an LED 54, which is an indicator lamp installed inside a vehicle, and a resistor R14.

When one of the protection control circuits 18 performs a protection control operation and the NPN transistor 42 is rendered on, a current flows through the resistor R13, a diode D4 and an NPN transistor 42 and is supplied to and turns on the LED 54, which is an indicator lamp.

In this embodiment, when one of the protection control circuits 18 performs a protection control operation and an NPN transistor 42 is rendered on, a current flows through the resistor R13, a diode D4 and the NPN transistor 42, and the LED 54 is turned on in order to output abnormality information externally, so that a driver can be notified that an abnormality has occurred in one of the LEDs 12.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A lighting control circuit for a vehicle lamp comprising:
    a plurality of series regulators including:
        a plurality of current detection devices for detecting a current supplied to a plurality of semiconductor light sources connected in parallel;
        a plurality of switching devices connected in series to the semiconductor light sources; and
        a plurality of comparators for comparing currents detected by the current detection devices with a predetermined value, and for controlling the ON/OFF operations of the switching devices in accordance with the comparison results;
    a switching regulator for supplying a current to the plurality of semiconductor light sources, and for adjusting a voltage to be output to the semiconductor light source; and a plurality of protection controllers for setting the states of the switching devices to a safe state in response to a voltage applied to the switching devices or to abnormalities detected as a result of a comparison performed by the comparators, wherein the switching regulator monitors the voltage to be output to the semiconductor light sources and sets the states of the semiconductor light sources to safe states upon the detection of an abnormal drop in the output voltage.

2. The lighting control circuit according to claim 1, wherein the switching regulator supplies the current to the plurality of semiconductor light sources as light emission energy by employing a voltage received from a power source as light emission energy for the plurality of semiconductor light sources, and adjusts the voltage to be output to the semiconductor light source to the maximum in accordance with states of the series regulators.

3. The lighting control circuit according to claim 2 wherein, as resistor devices, the current detection devices of the series regulators are connected in series with the switching devices to the semiconductor light sources,
    voltage drop values for the current detection devices are set greater than a range for a difference in the forward voltages of the plurality of switching devices, and
    the operating state of the switching regulator is set to the safe state when the comparison results obtained by all the plurality of comparators indicate an abnormality.

4. The lighting control circuit according to claim 3, further comprising:
    an operation halt instruction unit for monitoring a protection control operation performed by the plurality of protection controllers and for outputting an operation halt instruction to the switching regulator when the number of the protection controllers that performed the protection control operation has reached a predetermined number.

5. The lighting control circuit according to claim 4 further comprising:
    an abnormality information output unit for monitoring the protection control operation performed by the plurality of protection controllers and for externally outputting abnormality information when one of the protection controllers performs the protection control operation.

6. The lighting control circuit according to claim 3 further comprising:
    an abnormality information output unit for monitoring the protection control operation performed by the plurality of protection controllers and for externally outputting abnormality information when one of the protection controllers performs the protection control operation.

7. The lighting control circuit according to claim 2, further comprising:
an operation halt instruction unit for monitoring a protection control operation performed by the plurality of protection controllers and for outputting an operation halt instruction to the switching regulator when the number of the protection controllers that performed the protection control operation has reached a predetermined number.

8. The lighting control circuit according to claim 7 further comprising:
an abnormality information output unit for monitoring the protection control operation performed by the plurality of protection controllers and for externally outputting abnormality information when one of the protection controllers performs the protection control operation.

9. The lighting control circuit according to claim 2 further comprising:
an abnormality information output unit for monitoring the protection control operation performed by the plurality of protection controllers and for externally outputting abnormality information when one of the protection controllers performs the protection control operation.

10. The lighting control circuit according to claim 1, wherein, as resistor devices, the current detection devices of the series regulators are connected in series with the switching devices to the semiconductor light sources,
voltage drop values for the current detection devices are set greater than a range for a difference in the forward voltages of the plurality of switching devices, and
the operating state of the switching regulator is set to the safe state when the comparison results obtained by all the plurality of comparators indicate an abnormality.

11. The lighting control circuit according to claim 10, further comprising:
an operation halt instruction unit for monitoring a protection control operation performed by the plurality of protection controllers and for outputting an operation halt instruction to the switching regulator when the number of the protection controllers that performed the protection control operation has reached a predetermined number.

12. The lighting control circuit according to claim 11 further comprising:
an abnormality information output unit for monitoring the protection control operation performed by the plurality of protection controllers and for externally outputting abnormality information when one of the protection controllers performs the protection control operation.

13. The lighting control circuit according to claim 10 further comprising:
an abnormality information output unit for monitoring the protection control operation performed by the plurality of protection controllers and for externally outputting abnormality information when one of the protection controllers performs the protection control operation.

14. The lighting control circuit according to claim 1, further comprising:
an operation halt instruction unit for monitoring a protection control operation performed by the plurality of protection controllers and for outputting an operation halt instruction to the switching regulator when the number of the protection controllers that performed the protection control operation has reached a predetermined number.

15. The lighting control circuit according to claim 14 further comprising:
an abnormality information output unit for monitoring the protection control operation performed by the plurality of protection controllers and for externally outputting abnormality information when one of the protection controllers performs the protection control operation.

16. The lighting control circuit according to claim 1, further comprising:
an abnormality information output unit for monitoring the protection control operation performed by the plurality of protection controllers and for externally outputting abnormality information when one of the protection controllers performs the protection control operation.

* * * * *